(12) United States Patent
Conde (10) Patent No.: US 10,443,495 B2
(45) Date of Patent: Oct. 15, 2019

(54) COMBINED HEAT AND POWER SYSTEM AND METHOD OF OPERATION

(71) Applicant: ENEXOR ENERGY, Spring Hill, TN (US)

(72) Inventor: Ricardo Conde, New Salem, MA (US)

(73) Assignee: ENEXOR ENERGY, Spring Hill, TN (US)

( * ) Notice: Subject to any disclaimer, the term of this patent is extended or adjusted under 35 U.S.C. 154(b) by 139 days.

(21) Appl. No.: 15/487,666

(22) Filed: Apr. 14, 2017

(65) Prior Publication Data

US 2018/0298816 A1 Oct. 18, 2018

(51) Int. Cl.
| | | |
|---|---|---|
| F02C 7/08 | (2006.01) | |
| F02C 6/18 | (2006.01) | |
| F02C 3/26 | (2006.01) | |
| F01L 15/10 | (2006.01) | |
| F02C 1/04 | (2006.01) | |

(52) U.S. Cl.
CPC ............... *F02C 6/18* (2013.01); *F01L 15/10* (2013.01); *F02C 1/04* (2013.01); *F02C 3/26* (2013.01); *F02C 7/08* (2013.01); *Y02E 20/14* (2013.01); *Y02E 50/11* (2013.01); *Y02T 10/16* (2013.01)

(58) Field of Classification Search
CPC ...... F02C 1/04; F02C 1/05; F02C 3/26; F02C 3/365; F02C 7/08; Y02E 20/14; Y02E 50/11
See application file for complete search history.

(56) References Cited

U.S. PATENT DOCUMENTS

| | | | | |
|---|---|---|---|---|
| 2,404,938 A | * | 7/1946 | Armacost | F01K 23/103 122/DIG. 1 |
| 2,420,335 A | * | 5/1947 | Nettel | F02C 1/06 110/261 |
| 4,827,723 A | | 5/1989 | Engstrom et al. | |

(Continued)

OTHER PUBLICATIONS

Title: "The Externally Fired Gas Turbine (EFGT-Cycle) and Simulation of the Key Components"; Authors: Martin Kautz and Ulf Hansen; University of Rostock, Institute for Energy- and Environmental Technology; https://www.researchgate.net/publication/268369742_The_Externally_Fired_Gas_Turbine_EFGT-Cycle_and_Simulation_of_the_Key_Components—Oct. 16, 2016; 10 pgs.

(Continued)

*Primary Examiner* — Scott J Walthour
(74) *Attorney, Agent, or Firm* — Cantor Colburn LLP (57) ABSTRACT

A combined heat and power (CHP) system. The CHP system including a combustion chamber with an air inlet and an exhaust. The combustion chamber configured to receive a hot secondary gas for combustion. A heat exchanger coupled to the particle separator receives mixed combustion gases and transfers heat to a secondary gas. The CHP system also includes a turbine configured to receive and compress a secondary gas and direct the compressed secondary gas to the heat exchanger, the turbine is also configured to receive a heated compressed secondary gas and expand it to generate work therefrom, the expanded heated secondary gas is also used for combustion and to regulate the temperature of the combustion gases entering the heat exchanger. A generator is connected to the drive shaft of the turbine and configured to generate electricity with the work generated therein.

29 Claims, 2 Drawing Sheets

(56) References Cited

U.S. PATENT DOCUMENTS

| | | |
|---|---|---|
| 4,922,709 A | 5/1990 | Hendriks |
| 2005/0126177 A1 | 6/2005 | Primlani |
| 2005/0138930 A1 | 6/2005 | Foster-Pegg |
| 2012/0192580 A1 | 8/2012 | Santos |
| 2018/0163962 A1 | 6/2018 | Geselle |

OTHER PUBLICATIONS

Title: Thermodynamic optimization of an open cycle of an externally fired micro gas turbine. Part 2: Performance optimization; Authors: Lingen Chen, Wanli Zhang and Fengrui Sun; International Journal of Low-Carbon Technologies 2014, 9, pp. 189-194; 6 pgs.
Univerita Di Pisa; Department of Electrical Systems and Automation; PowerTep; Title: "Externally fired micro gas turbine (75kWe) for combined heat and power generation from solid biomass: Concept, efficiency, cost, and experiences from pilot and commercial plants in Italy"; Authors: S. Barsalli and G. Ludovici; TEP srl, via G. Volpe, 92, I-56121 Pisa, Italy; Potenzial und Technik zur Holzenergie-Nutzung—Sep. 17, 2010, ETH Zürich; 16 pgs.
PCT International Search Report and Written Opinion for International application No. PCT/US18/24444; International Filing Date: Mar. 27, 2018; dated Jun. 7, 2018; 15 pgs.

\* cited by examiner

COMBINED HEAT AND POWER SYSTEM AND METHOD OF OPERATION

TECHNICAL FIELD

The subject matter described herein relates to a combined heat and power system, in particular to a thermal system utilizing waste organic resources and converting it into heat energy used to drive a gas turbine coupled to the thermal system to produce power and a high level of usable waste heat for both low and high temperature thermal applications.

BACKGROUND

Combined heat and power (CHP) systems have been utilized in many forms for over 100 years. The most common are fossil fuel fired systems that use, for example, steam turbines, gas fired turbines and internal combustion engines to produce power. The reject heat from these systems can be used for a wide range of applications such as heating, cooling and in some cases where the waste heat temperature is high enough can be used to drive a second cycle. Most of the focus for traditional CHP systems has been large fossil fueled fired systems connected to district heating grids. Over the past 30 years the focus moved to smaller distributed CHP systems where the heat or power generated could be better utilized by the end user. These systems have also been fossil fueled fired systems that commonly use small gas turbines or reciprocating engines to produce power along with usable waste heat from the cycle. Other systems that use Organic Rankine Cycle have also been used although the quality of the waste heat is relatively low which limits the applications for the heat.

More recently, the focus to use renewable organic waste streams for fuel has been predominant and progressing the technology. Large biomass and municipal solid waste to power systems have been in operation for many decades. The ability to utilize a wide variety of organic sources in a small CHP system (for example, less than 1 MW electric) has been challenging for a number of reasons. There have been many small organic to power conversion technologies that have been utilized to varying degrees of success. Gasification of organics into syngas has been one approach to convert a solid fuel into a hydrocarbon gas for combustion in traditional power systems. Unfortunately, these systems can be costly, especially when scaled to smaller scale applications. In addition, the organic feed stock can present particular challenges in application. For example, depending on the gasification method and conversion efficiencies, the potential energy available in some organics suffers from losses that have an economic impact on the cost of power and heat. Gasification of mixed organic residues is particularly problematic for many gasification systems.

Another method applied for small CHP applications has been to use direct combustion of the organics through an appropriate combustor and using the heat through a heat exchanger to drive an externally fired engine. Traditional externally fired systems include Stirling cycle, Steam Rankine, Organic Rankine, and super critical CO2 cycles. In all of these systems the temperature of the reject heat affects the cycle efficiency. The higher the reject heat temperature the lower the power efficiency. With the exception of the steam cycle the other thermodynamic cycles typically lose efficiency when producing even hot water at 90° C. However, with the steam cycle, the deficiency is the complexity and cost associated with a high pressure steam circuit in a small application.

Another method that has been employed more recently is to use an open Brayton cycle gas turbine and introduce heat indirectly through a heat exchanger. Several systems have been tested where a small turbine has been coupled to an organic combustion system. In these systems ambient air is compressed in the compressor of the turbine and then directed to a recuperator to preheat the compressor air. The compressed and preheated air is then directed to the hot heat exchanger to be heated by the organic combustion system. The highly heated air is then expanded in the turbine to produce work to turn a generator and generate electricity. Continuing the cycle, the hot turbine gases are used for preheating in the recuperator as mentioned earlier. The turbine exhaust hot gases may then be exhausted or directed to a further heat exchanger where combustion air is heated with exhausted combustion gases and directed to the combustion process. In all of the configurations of the prior art the turbine utilizes a recuperator to preheat compressed ambient air. Furthermore, most existing systems employ a combustion air pre-heater to recover heat from the combustion gases as well as the heat remaining in the turbine exhaust. While these approaches improve the thermal to electric conversion efficiency, it requires multiple heat exchangers and complex piping for routing of the gases in the circuit which may reduce the overall system efficiency.

The effect of the recuperator is to raise the temperature of the compressor air prior to the hot heat exchanger. Heat is extracted from the expansion turbine to preheat the compressor air. The compressor air is further heated by the hot heat exchanger where heat is extracted from the combustion gases. Utilizing the recuperator reduces the size of the hot heat exchanger. However, it also reduces the amount of heat energy extracted from the combustion gases. In order to achieve high thermal electric efficiency, it is desired to recover as much heat as practicable from the exhaust combustion gases. Since the combustion exhaust gases cannot be directly fed back to the combustion system, a combustion air pre heater is necessary to recover the heat from the exhaust gases. These losses can be reduced by using the turbine exhaust air as the combustion air but this still requires the air preheater.

Another challenge for existing systems is related to controlling the temperature of the combustion gases entering the hot heat exchanger. For applications using a Brayton cycle gas turbine it is desirable to be able to deliver the compressor (or expander) air at the design inlet temperature of the turbine. In many cases this temperature can be as high as 950° C. To achieve this inlet air temperature, heat exchangers need to operate near the maximum design temperature limits. In addition, it is important to be able to maintain a constant temperature at the heat exchanger. Overheating and temperature variations could cause stresses on the heat exchanger as well as the expansion turbine while under heating would cause lower inlet temperatures reducing power and efficiency. Variations in temperature can be a significant concern when combusting mixed fuels that can have very large differences in heat values.

Existing systems also commonly utilize a constant volume feeding system to deliver the solid fuel into the combustion chamber. There is no system to determine the heat value of mixed solid fuels as it is fed into the combustion chamber. As the fuel is burned the higher heat value fuel will cause an increase in temperature of the exhaust gases while the lower heat value fuels will have the opposite effect. As a result, mixed solid fuels create varying gas temperature flows which cannot readily be corrected by adjustment of the feed system.

BRIEF SUMMARY

Described herein in an embodiment is a combined heat and power (CHP) system. The CHP system including a combustion chamber with a gas inlet and an exhaust. The combustion chamber configured to receive a hot secondary gas for combustion. The CHP system also includes a proportional valve operably coupled in series with the gas inlet and operable to control the flow of the heated expanded secondary gas thereto. An exhaust plenum operatively connected to the combustion chamber and configured to receive high temperature combustion gases therefrom, the plenum including a secondary gas port operable to direct the expanded heated secondary gas to the exhaust plenum for mixing with the high temperature combustion gases. A heat exchanger coupled to the exhaust plenum receives mixed combustion gases and transfers heat to a secondary gas. The CHP system also includes a turbine configured to receive and compress a secondary gas and direct the compressed secondary gas to the heat exchanger, the turbine is also configured to receive a heated compressed secondary gas and expand it to generate work therefrom, the expanded heated secondary gas is also used for combustion and to regulate the temperature of the combustion gases entering the heat exchanger. A generator is connected to the drive shaft of the turbine and configured to generate electricity with the work generated therein.

In addition to one or more of the features described above or below, or as an alternative, further embodiments could include a control mechanism for controlling the feed rate of the solid fuel into the combustion chamber.

In addition to one or more of the features described above or below, or as an alternative, further embodiments could include that the control mechanism includes a feed mechanism and a control valve.

In addition to one or more of the features described above or below, or as an alternative, further embodiments could include a temperature sensor, the temperature sensor operable to sense the temperature of the combustion gases at the combustion gas exhaust.

In addition to one or more of the features described above or below, or as an alternative, further embodiments could include that the temperature sensor is at least one of a thermocouple, infrared detector and a semiconductor detector.

In addition to one or more of the features described above or below, or as an alternative, further embodiments could include a high temperature particle separator having an inlet and an exhaust, the separator operatively connected to the combustion chamber and configured to receive high temperature combustion gases therefrom, wherein the exhaust includes the exhaust plenum.

In addition to one or more of the features described above or below, or as an alternative, further embodiments could include that the high temperature particle separator includes at a cyclonic separator, the cyclonic separator operably coupled to a hopper for removal of particulate matter.

In addition to one or more of the features described above or below, or as an alternative, further embodiments could include that the cyclonic separator removes about 99% of all particulates larger than five microns.

In addition to one or more of the features described above or below, or as an alternative, further embodiments could include that the gas valve is a proportional valve operably connected to a controller and configured to control a flow of the heated expanded secondary gas to mix with the high temperature combustion gases.

In addition to one or more of the features described above or below, or as an alternative, further embodiments could include that the gas valve controls the flow of the heated expanded secondary gas to mix with the high temperature combustion gases based on a temperature of at least one of the expanded secondary gas, the high temperature combustion gas and the mixed combustion gases.

In addition to one or more of the features described above or below, or as an alternative, further embodiments could include that the proportional valve is operably connected to a controller and configured to control the flow of the heated expanded secondary gas into the combustion chamber.

In addition to one or more of the features described above or below, or as an alternative, further embodiments could include that the proportional valve controls the flow of the heated expanded secondary gas to the combustion chamber based on a temperature of at least one of the expanded secondary gas, the high temperature combustion gas, the mixed combustion gases, and a temperature of the heated compressed secondary gas.

In addition to one or more of the features described above or below, or as an alternative, further embodiments could include that the proportional valve controls the flow of the heated expanded secondary gas to the combustion chamber based on a temperature of the heated compressed secondary gas.

In addition to one or more of the features described above or below, or as an alternative, further embodiments could include a second temperature sensor, the second temperature sensor operable to sense the temperature of the mixed combustion gases.

In addition to one or more of the features described above or below, or as an alternative, further embodiments could include a third temperature sensor, the third temperature sensor operable to sense the temperature of the heated expanded secondary gas.

In addition to one or more of the features described above or below, or as an alternative, further embodiments could include a controller, the controller operably connected to at least one of a first temperature sensor, a second temperature sensor, and a third temperature sensor, the controller also operably connected to at least one of the control mechanism, a proportional valve and a gas valve, the controller configured to execute a method to control at least one of a feed rate of the solid fuel into the combustion chamber, a flow of the expanded heated secondary gas into the combustion chamber, and a temperature of the mixed combustion gas.

In addition to one or more of the features described above or below, or as an alternative, further embodiments could include a blower and a heater operably connected to the combustion chamber, the blower and the heater configured to operate to initiate combustion of the solid fuel in the combustion chamber.

In addition to one or more of the features described above or below, or as an alternative, further embodiments could include a draft inducing exhaust fan operably connected to the combustion chamber, the draft inducing exhaust fan configured to maintain the combustion chamber at a lower pressure that the expanded heated secondary gas.

In addition to one or more of the features described above or below, or as an alternative, further embodiments could include that the high temperature heat exchanger is configured as a single counter flow heat exchanger.

In addition to one or more of the features described above or below, or as an alternative, further embodiments could include a low temperature heat exchanger operably connected to the high temperature heat exchanger and configured to receive the mixed combustion gases that have been cooled therein, the low temperature heat exchanger operable to transfer heat from the cooled mixed combustion gases to a secondary low temperature working fluid for a secondary low temperature application.

Also described herein in an embodiment is a method of operating a combined heat and power (CHP) system. The method includes initiating a combustion process in a combustion chamber and combusting a solid fuel with an expanded heated secondary gas and generating a high temperature combustion gas, and regulating a temperature of the high temperature combustion gases with an expanded heated secondary gas to yield a mixed combustion gas. The method also includes compressing a secondary gas, transferring heat from the mixed combustion gas to a compressed secondary gas, expanding a compressed heated secondary gas and generating work thereby, and employing the work generated.

In addition to one or more of the features described above or below, or as an alternative, further embodiments could include at least one of controlling a feed rate of the solid fuel into the combustion chamber, controlling a flow rate of the expanded heated secondary gas into the combustion chamber, and controlling the regulating based on at least one of a temperature of the expanded heated secondary gas, a temperature of the mixed combustion gas, a temperature of the high temperature combustion gases, and the work generated.

In addition to one or more of the features described above or below, or as an alternative, further embodiments could include that the regulating a temperature of the high temperature combustion gases includes controlling a flow of the heated expanded secondary gas and mixing with the high temperature combustion gases after the separating.

In addition to one or more of the features described above or below, or as an alternative, further embodiments could include measuring a temperature of the high temperature combustion gases.

In addition to one or more of the features described above or below, or as an alternative, further embodiments could include measuring a temperature of the mixed combustion gas.

In addition to one or more of the features described above or below, or as an alternative, further embodiments could include measuring a temperature of the expanded heated secondary gas.

In addition to one or more of the features described above or below, or as an alternative, further embodiments could include that the transferring occurs in a counter flow heat exchanger.

In addition to one or more of the features described above or below, or as an alternative, further embodiments could include that the expanded heated secondary gas is at a temperature of about 600° C. and is applied directly into the combustion process.

In addition to one or more of the features described above or below, or as an alternative, further embodiments could include that the combustion process achieves a temperature of at least one of 1000° C., 1050° C. 1100° C., and 1150° C.

In addition to one or more of the features described above or below, or as an alternative, further embodiments could include removing particulate matter from the high temperature combustion gases with a high temperature particle separator.

Other aspects, features, and techniques of embodiments will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Described herein in one or more embodiments is a combined heat and power system, utilizing waste organic resources and converting it into heat energy used to drive a gas turbine coupled to the thermal system to produce power and a high level of usable waste heat for both low and high temperature thermal applications.

One feature of the described embodiments is to configure the system with one heat exchanger which functions to heat the compressor air from the discharge temperature to the maximum temperature needed at the turbine inlet. By removing the recuperator from the circuit, more energy is extracted from the combustion gases, thereby reducing the temperature of the combustion gases after the heat exchanger. The heat exchanger may be larger than the hot heat exchanger to accommodate the higher heat energy transfer, although is equal to or smaller than the recuperator and hot heat exchanger combined. One advantage of this configuration is that the turbine exhaust air is very hot and can reach temperatures of 600° C. This hot air can be used directly into the combustion system without the need of the combustion air preheater which reduces cost and improves efficiency.

Another feature of the described embodiments of a combustion system includes a temperature sensor, such as a thermocouple, to measure the temperature of the combustion exhaust gas leaving the combustion chamber. In an embodiment, a high temperature cyclone particle separation system is used to remove about 99% of particles above about 5 micron in size from the combustion gases to reduce fouling of the heat exchanger. In order to obtain complete combustion, it is desired to achieve a combustion gas temperature of at least 1000° C. Higher temperatures are desired up to the point where NOx formation can become an emissions limitation. In some embodiments, the combustion gas temperature is generally higher than the maximum temperature limit for the heat exchanger. The hot gas exiting the cyclone separator flows through a duct which has a port for introducing a secondary gas. This gas can be any available gas stream with a lower temperature than the combustion gas. One source would be turbine exhaust air or outside air can also be used. A proportional flow valve is attached to the port to control the amount of mass and heat energy entering the combustion gas flow. The purpose of the secondary gas flow is to lower the combustion gas temperature and adjust for fluctuations in gas temperature. The thermocouple which measures the combustion gas temperature leaving the chamber sends a signal to the proportional valve to let more or less gas into the system. Since the gas takes approximately 1 second to travel from the combustion chamber exit to the valve, this gives adequate time for the valve to react. A second temperature sensor, such as a thermocouple, is positioned downstream of the mixing zone and before the heat exchanger is used to send a signal to the proportional valve to maintain the desired heat exchanger temperature and fine tune the gas temperature.

Yet another feature of the described embodiments is a combustion chamber that includes a mechanical feed system to deliver solid fuel to the chamber. An air blower and external heat source is coupled to the combustion chamber to start combustion. A plurality of gas ports to supply primary combustion air from a gas turbine. A temperature sensor, such as a thermocouple, is coupled to the combustion gas exit is provided to measure the gas temperature.

Another feature of the described embodiments includes a plurality of high temperature cyclone particle separators coupled to the combustion chamber, to clean the exhaust gas. An ash removal system is provided and includes a mechanical auger or pneumatic system to remove the particles from the cyclone.

Further aspects of the described embodiments include an exhaust plenum coupled to the cyclone is provided. A secondary gas port is coupled to the exhaust plenum to allow secondary gas to be introduced. An electronically controlled proportional valve coupled to the gas port is provided to control the mass flow of the secondary gas. A mixing zone is provided in the plenum for the gases to come to temperature equilibrium. A thermocouple is coupled to the plenum after the mixing zone to measure the gas temperature. A thermocouple coupled to the secondary port is provided to measure the gas temperature of the secondary gas. An electronic controller is provided to automatically control the proportional valve.

Moreover, a further feature of the described embodiments includes a heat exchanger coupled to the exhaust plenum is provided. A gas turbine coupled to the heat exchanger is also provided. A fluid connection from the compressor section of the gas turbine coupled to the low temperature side of the heat exchanger. A fluid connection from the hot side of the heat exchanger coupled to the inlet of the expansion turbine. A fluid connection from the cold side of the heat exchanger coupled to a low temperature heat exchanger is provided to remove residual heat from combustion gases. A fluid connection coupled to the expansion turbine exhaust is coupled to the combustion chamber to provide combustion air. In another embodiment a proportional valve is coupled to the combustion chamber to provide combustion air. A second fluid connection coupled to the expansion turbine exhaust is coupled to the proportional valve at the exhaust plenum of the particle separator. A third fluid connection coupled to the expansion turbine exhaust is provided to use residual high temperature air for thermal applications.

Additional features of the described embodiments include a method of controlling the temperature of the combustion gases prior to the heat exchanger is provided. A temperature sensor, such as a thermocouple, positioned at the combustion chamber outlet measures the temperature of the gas. The deviation from the controller temperature set point sends a signal to the proportional valve that exhaust gas is flowing towards the heat exchanger that is off the set point temperature. An algorithm is used to proportionally open or close the proportioning valve relative to the temperature deviation. Gas from the turbine exhaust or alternatively from ambient air is introduced into the combustion gases to lower the temperature to the controller set point. A second thermocouple, positioned after the mixing zone, senses the temperature after the mixed gas comes to thermal equilibrium. The second thermocouple sends a signal to the controller to adjust the mass flow rate change of the proportional valve.

Another aspect of the described embodiments is a method of increasing or maximizing the thermal electric efficiency is provided with the use of a single counter flow heat exchanger. A counter flow heat exchanger is fluidly coupled to the exit of the mixing plenum. An open cycle Brayton gas turbine is fluidly coupled to the heat exchanger. A fluid connection from the turbine compressor exit is coupled to the cold end of the heat exchanger. A fluid connection from the hot side of the heat exchanger is coupled to the expansion turbine inlet. A fluid connection from the outlet of the turbine is coupled to the proportional valve. A second fluid connection from the outlet of the turbine is optionally coupled to a proportional valve and then to the combustion chamber. A third fluid connection from the outlet of the turbine is provided for additional thermal applications. Combustion gases flowing into the heat exchanger transfer a large percentage of available heat to the working gas of the turbine due to the low compressor outlet temperature. High temperature (600° C.) clean dry air exits the expansion turbine and is available for heat recovery via the secondary gas mixing port. The hot air can also be used directly into the combustion chamber as combustion air without the need to preheat. The hot air can also be used for high temperature applications sensitive to moisture and particulates. In addition the high temperature heat can be used for second cycle power generation.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Figure 1:
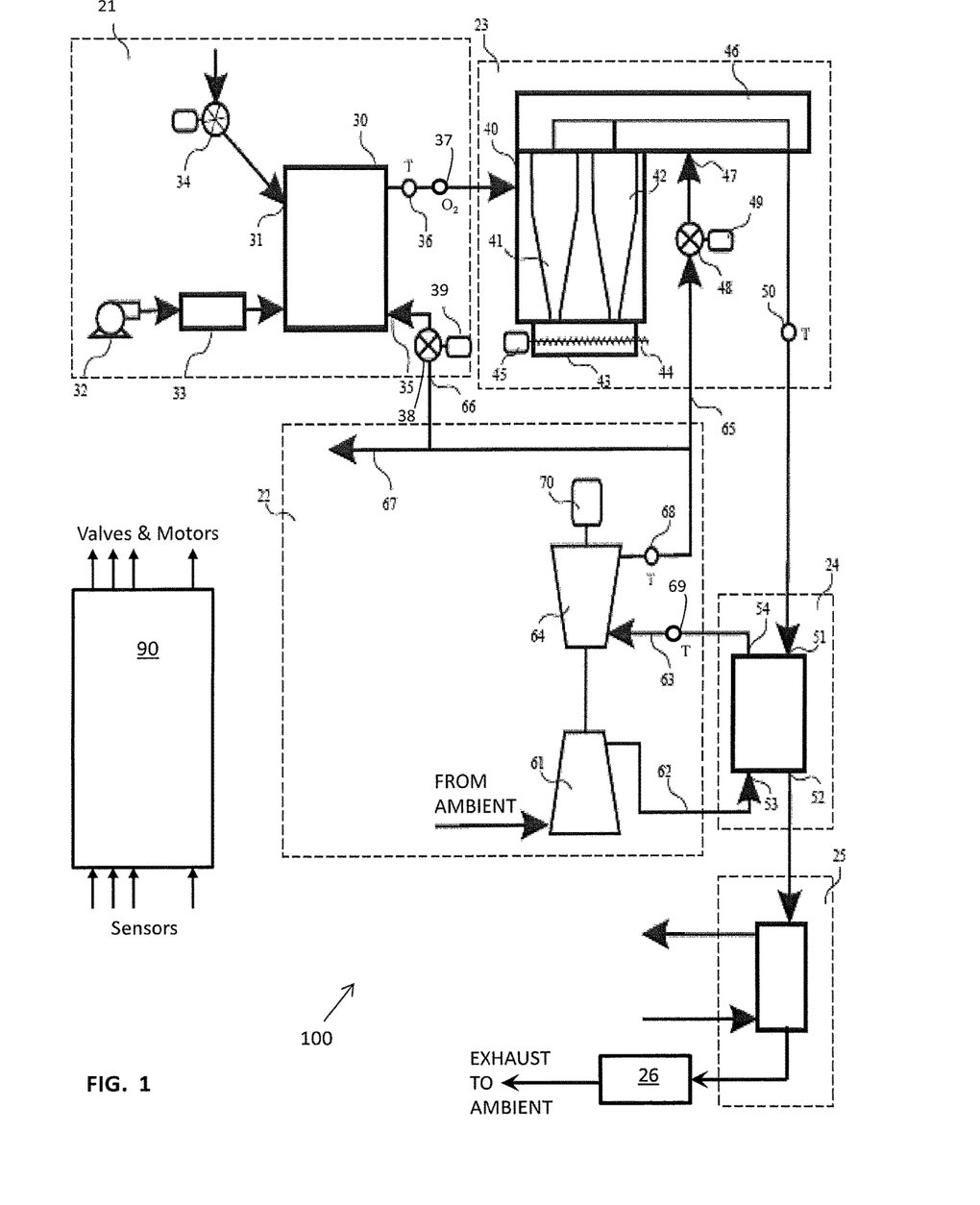
FIG. 1 is a schematic block diagram illustration of a combined heat and power system in accordance with an embodiment.

FIG. 1 depicts a combined heat and power system (CHP) 100 in accordance with an embodiment. The CHP system 100 utilizes a combustion system 21, an open cycle Brayton gas turbine 22, a high temperature cyclone particle separator 23, a high temperature heat exchanger 24 to transfer heat generated in the combustion system 21 into the turbine 22 and optionally a low temperature heat exchanger 25, and a draft fan or blower 26.

All indirect fired power systems utilize at least one heat exchanger in order to transfer heat from the combustion process to the working gas of the engine. Depending on the type of engine cycle, the heat transfer will occur at different temperatures. For cycles such as Organic Rankine the temperature delivered to the engine is rarely above 500° C. and is more typically below 250° C. The advantage of using an ORC is that it can utilize lower temperature heat and subsequently lower cost heat exchangers. The disadvantage is lower efficiency, higher cost, and low temperature waste heat rejected from the cycle, typically less than 90° C., which is not readily utilized elsewhere.

Therefore, it is often preferable to use a higher temperature cycle such as an open Brayton cycle to more directly and efficiently utilize the high temperatures available from the combustion system 21. Current Brayton turbine engines are designed to utilize heat at about 950° C. The advantages of the higher temperature cycle are higher efficiency, lower cost and high temperature waste heat rejected from the cycle typically as high as 600° C. The disadvantage is the need to utilize more specialized components in the combustion gas path as will be discussed further herein.

In an embodiment, the combustion system 21 further includes, but is not limited to, a combustion chamber or housing 30 for burning of organic fuel to generate heat. Biomass fuels, that is, organic materials produced in a renewable manner, include, for example, woody fuels such as wood chips, saw grass, and the like, animal wastes, i.e., manures, or even municipal solid waste (MSW). The combustion chamber 30 also includes an opening, valve, or port 31 for delivering the fuel into the combustion chamber 30, a blower 32 and an electric heater 33 for delivering combustion air and heat for startup. The combustion system 21 also includes a valve 34 for metering the mass of the solid fuel directed into the combustion chamber 30, a port 35 for delivering combustion air from the turbine 22, an optional proportional valve 38 for metering the combustion air from the turbine 22, a temperature sensor e.g., thermocouple 36 to measure combustion exhaust temperature and a controller 90 to receive various sensor inputs such as temperatures, valve positions, speeds and the like, as well as to control the various valves and electric motors in the system 100.

In an embodiment, the particle separator 23 further includes a housing 40 with one or more cyclones 41, 42, a disengagement hopper 43 for particulate collection, a mechanical auger 44 for removing particles from the hopper 43, and a motor 45 to drive the auger 44. The particle separator 23 is designed to operate at the combustion gas temperature about 1150° C. and is constructed of materials capable of operating at such temperatures and also designed to be resistant of the abrasive and corrosive effects of the combustion gas. In an embodiment, the particle separator is constructed of refractory ceramics that provide thermal shock resistance, abrasion resistance and thermal insulative properties. The cyclone particle separator 23 also includes an exhaust plenum 46, including a secondary gas port 47, a proportional gas flow valve 48, a motor 49 connected to the gas flow valve 48 to automatically control the position and speed of the valve and a temperature sensor, such as thermocouple 50, to measure gas temperature in the exhaust plenum 46.

The CHP system 100 also utilizes a high temperature heat exchanger 24 which includes a first port 51 for directing hot combustion gas into the heat exchanger 24, a port 52 for directing cold combustion gas out of the heat exchanger 24, an input port 53 for directing cold compressor air into the heat exchanger 24 and a port 54 for directing hot air from the heat exchanger 24 into the expansion turbine 64. The high temperature heat exchanger 24 is configured to operate at temperatures as high as about 1100° C. Heat exchangers capable of operating in the high temperature range needed for this application operate near the structural limits of the metals employed, typically made of stainless steel or nickel alloys. Therefore, careful accurate control of the temperature of the combustion gases ensures that the temperature limits of the high temperature heat exchanger 24 materials are not exceeded. In addition, control the smallest differential temperature between the exhaust gas entering the high temperature heat exchanger 24 and the working gas leaving the heat exchanger 24. The lower the differential temperature is the lower the maximum working temperature of the heat exchanger. Lower differential temperatures reduce stresses in the high temperature heat exchanger 24, prolonging its life. For example, with a desired turbine inlet temperature of 950° C. the combustion gas would preferably be delivered at 960° C. It should be appreciated that such temperatures are at the extreme end of metal heat exchangers structural capabilities and requires accurate and precise control of the temperature of the combustion gas delivered to the high temperature heat exchanger 24.

In an embodiment, a single counter flow heat exchanger is employed to improve the thermal electric efficiency of the CHP system 100. It will be appreciated that other heat exchanger configurations are possible. In an embodiment a stainless steel or nickel alloy, single counter flow plate or tube style heat exchanger is employed, however, other types may be utilized as well, including, but not limited to, tube and shell, micro tube, microchannel, plate types, and the like. In an embodiment, the high temperature heat exchanger may be constructed of ceramic or nickel alloy steel. Advantageously, ceramic heat exchangers can operate at temperatures in excess of 1100° C. while conventional metal heat exchangers typically cannot exceed 950° C. While ceramic heat exchangers have several advantages, in an embodiment a metallic heat exchanger is employed. The control of the combustion gas temperature entering the high temperature heat exchanger 24 reduces cost in two ways. The first is that tightly controlling the temperature of the combustion cases to the high temperature heat exchanger 24 ensures the ability to use metal heat exchangers instead of ceramic heat exchangers which are significantly more expensive. Ceramic heat exchangers can be 75% more expensive than metallic. In some cases it allows for the use of stainless steel instead of more costly Nickel alloys. The second cost savings is in extended life of the heat exchanger lowering the maintenance cost over time. Power generation equipment typically has an expected twenty year service period. Operating the high temperature heat exchanger at high temperatures can experience higher thermal stresses which may result in failures in only 10-15 years. Reducing thermal stresses with well controlled combustion gas temperatures will ensure extended operation on the order of twenty years which translates into a 25% reduction in maintenance cost.

The open cycle Brayton gas turbine system 22 further includes a turbine compressor 61 to compress ambient air, a fluid connection 62 from the turbine compressor outlet to the heat exchanger input port 53 that carries compressed ambient air the high temperature heat exchanger 24. The gas turbine system 22 also includes a fluid connection 63 from the high temperature heat exchanger 24 outlet port 54 to the expansion turbine 64 inlet. The turbine expander 64 operates to expand the working gas (in this instance the heated ambient air) and produce usable work, for example turning a generator 69 to generate electricity. The turbine system 22 also includes a fluid connection 65 from the outlet of the expansion turbine 64 to the proportional valve 48 of the particle separator 23, a fluid connection 66 from the expansion turbine 64 to the combustion chamber 30 of the combustion system 21, and a fluid connection 67 from the expansion turbine 64 for auxiliary high temperature thermal applications, a temperature sensor, such as thermocouple 68, is employed to measure the temperature of the expansion turbine 64 exhaust. The turbine system also includes a generator 69 connected to the shaft of the turbine to produce electrical power.

The advantages of using a single heat exchanger in the CHP system 100 relates to improved thermo-electric efficiency and cost. A typical configuration for an open Brayton cycle turbine CHP system would include a combustion air pre-heater, recuperator and a hot heat exchanger. The recuperator is used to recover heat energy from the turbine exhaust to pre-heat compressor working air. The hot heat exchanger is used to further heat the working air to the desired turbine inlet temperature. The combustion air pre-heater is required to recover heat energy from either the turbine exhaust air or the combustion gases leaving the hot heat exchanger. In this configuration the turbine exhaust temperature is low (160° C.) and is usable for low temperature applications only. Since much of the recovered heat energy occurs in the recuperator the combustion gas temperature leaving the hot heat exchanger is high (650° C.). In order to achieve satisfactory thermo-electric efficiency the combustion gas is used to pre-heat the combustion air in the pre-heater.

There are several advantages of utilizing a single high temperature heat exchanger 24 in an open cycle Brayton CHP system 100. First, utilizing a single heat exchanger to heat the compressor working gas extracts more heat energy from the combustion gas compared to using a recuperator and hot heat exchanger as in conventional systems. The size of the single high temperature heat exchanger would be slightly larger than the hot heat exchanger, for example, approximately the same size as the recuperator and hot heat exchanger combined, but would eliminate the interconnections which introduce a pressure drop in the working gas. This pressure drop can be as high as 0.5% of the power generated from the turbine.

A second advantage of utilizing a single high temperature heat exchanger is the elimination of a combustion air pre-heater typically employed in conventional systems. Once again this reduces the complexity and cost of the system and any pressure drops associated with the heat exchanger and pipe connections results in the combustion blower or draft fan to draw more power and is a parasitic energy loss. The extra energy from the fan can represents an additional 0.5% energy loss in usable power.

A third advantage of utilizing a single high temperature heat exchanger is the overall heat transfer efficiency of the system which is increased utilizing a single heat exchanger due to the ability to recover heat that would not be transferred through the combustion air pre-heater due to the pre-heaters heat transfer efficiency. Another advantage of utilizing a single high temperature heat exchanger is the overall cost reduction for the system. Elimination of the recuperator and the interconnecting pipes for the recuperator to hot heat exchanger as well as the combustion air pre-heater and its interconnecting pipes represents about a 6% savings in the overall cost of the system. Therefore the cost of the generated power and heat in the system is reduced.

Utilizing a single high temperature heat exchanger 24 allows approximately 15% more heat energy to be reintroduced back into the CHP system 100 prior to the heat exchanger as usable heat for the turbine. When all losses are considered, utilizing a single heat exchanger as described herein, would yield 4% more power at any given power output compared to using multiple heat exchangers which depending on the turbine cycle efficiency translates into a 1.3% improvement in overall thermo-electric efficiency.

Figure 2:
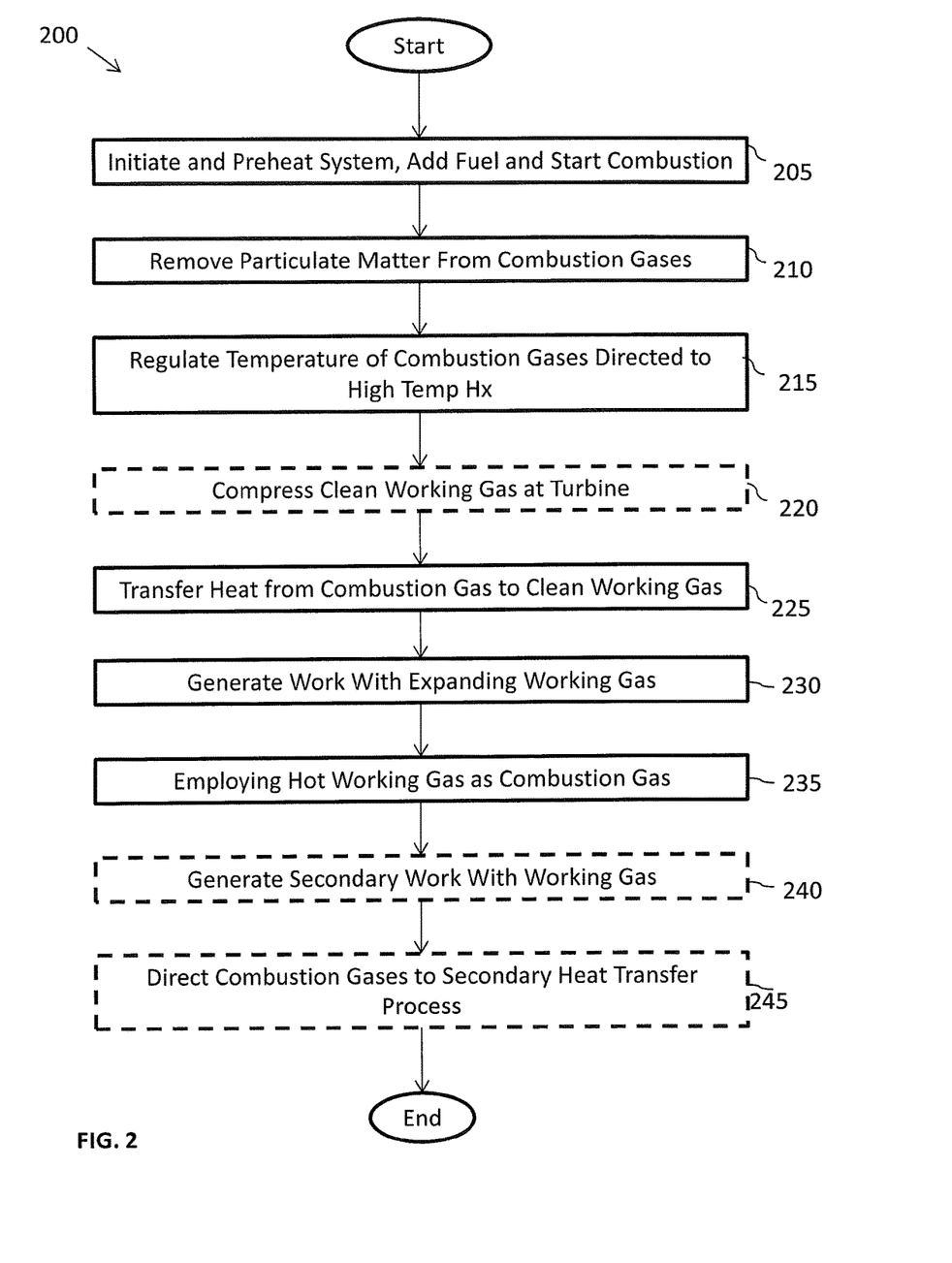
FIG. 2 is a flow chart depicting a method of controlling a combined heat and power system in accordance with an embodiment.

Continuing now to FIG. 2, with continuing reference to FIG. 1, where the process 200 on controlling the combustion of the CHP system is depicted. In operation, the method includes starting the CHP system 100 by turning on the combustion air blower 32 and electric heater 33. Ambient air is heated and delivered into the combustion chamber 30 as depicted at process step 205. In an embodiment, the air is pre heated to 800° C. other temperatures may be employed depending on the application, combustion chamber 30 and the type of fuel being employed. When the combustion chamber 30 is heated to a selected temperature, solid fuel can be introduced through the valve 34 where combustion then begins. In an embodiment the rotary valve 34 is used to control the feed rate of fuel into the combustion chamber 30 In an embodiment the temperature to introduce fuel is selected to be 350° C., however, other temperatures may be employed. In an embodiment, the proportional valve 34 may include multiple cavities and rotates to meter the amount of solid fuel entering the combustion chamber 30. It also functions as an air lock to prevent hot combustion gases from back flowing into the fuel feed and organic fuel storage.

As the combustion process continues the combustion gas temperature increases to the working temperature of the combustion system 21. The proportional valve 38 controls the mass flow of the hot working gas entering the combustion air port 35 in the combustion chamber 30. The proportional valve 38 can be any automatically controlled valve including butterfly, gate, ball, flapper or other mechanical system. The proportional valve 38 is driven by a servo motor 39 connected to the valve 38. The proportional valve 38 can be driven by a DC servo motor 39, hydraulically, pneumatically or by other electro-mechanical position systems. The servo motor is connected to the controller 90 and is driven by a signal from the controller 90.

Combustion systems which utilize organic materials commonly control the air/fuel ratio by means of an oxygen or Lambda sensor 37 which tells the controller 90 to either vary the fuel or air being supplied to the combustion chamber 30. In a CHP system 100 the oxygen sensor 37 is primarily used to insure a positive oxygen/fuel ratio mainly during startup and does not necessarily control the combustion air supply.

One method of controlling the air supply in a CHP combustion system utilizing an exhaust draft fan is to use a proportional valve 38 that can vary the combustion air flow over a range, for example, from 0%-100%. In operation when burning a consistent material with consistent moisture content the proportional valve 38 just needs to supply sufficient air for complete combustion and to meet the thermal demand called for. When all conditions are constant there is little need to control the air/fuel except when a change in demand is made.

For operations where the fuel is an organic material, it may be mixed and exhibit different heat values as well as varying moisture content. With such fuel, control of the air/fuel ratio becomes more important in order to maintain a more constant output temperature. Determining the moisture and heat value of the fuel stream entering the combustion chamber 30 is typically, not very practical. Moreover, as a result of these inconsistencies, fluctuations in the exhaust gas temperatures can be significant. Therefore, control of the exhaust gas temperature after combustion becomes the most viable means of ensuring the set point temperature desired for combustion.

When using turbine working gas for the combustion air, the compressed turbine working gas can be introduced to the combustion chamber 30 at varying temperatures. For example, using the expanded working gas directly from the expansion turbine 64 for maximum heat recovery would deliver the working gas at temperatures of 600° C. However, if the expanded working gas is also used for a second cycle such as to produce power or for a high temperature thermal application such as sludge drying then the working gas temperature being delivered to the combustion chamber 30 will be lower and can be as low as 50° C. These conditions can also change due to change in the power output of the generator 70 as well as other transient effects normal to the combustion of certain organic fuels and operation of the system 100.

In an embodiment, the target working temperature for the combustion process is about 1100° C., depending on the type of combustion chamber and fuel being employed. It will be appreciated that other combustion working temperatures are possible. It will be appreciated that the desired working temperature for the combustion process may be selected based on several factors. Higher temperatures are commonly desired for cleaner burning of fuel with lesser amounts of particulate emissions, Hydrocarbon emissions e.g., Carbon Monoxide (CO) emissions, Nitrous Oxide NOX emissions, and the like. Conversely, lower temperatures may be desirable for downstream components such as heat exchangers, and the like.

The combustion gas temperature is measured at the exit by a temperature sensor 36 e.g. thermocouple, IR sensor semiconductor sensor, and the like, which is used to control both feed rate of fuel to the combustion chamber 30 as well as the hot temperature gas to be directed to downstream processes. As the gas exiting the combustion housing 30 the temperature is measured by temperature sensor 36. The controller 90 has a defined set point temperature of what average combustion temperature should be. In an embodiment, the controller 90 employs a time averaged temperature measurement to control the solid fuel rotary valve 34 speed to control the feed rate of the fuel. The rotary valve is configured to provide feed of the solid fuel into the combustion chamber 30 while also providing an air lock to avoid escaping combustion gases. By using a time averaged temperature measurement for control of the rotary valve allows the rotary valve 34 to maintain a more constant speed rather than responding to fluctuations in the output temperature of the combustion gas. The gas temperature leaving the combustion chamber 31 can be as high as 1150° C. which exceeds the maximum temperature for most heat exchangers. The high temperature is desirable in order to achieve complete combustion and eliminate un-burnt hydrocarbon emissions.

As mentioned above, controlling the power and heat generated by the system 100 requires not only controlling the feed rate of fuel to the combustion chamber 30, but also the combustion air directed to the combustion chamber 30. To maintain near constant exhaust gas temperatures with varying combustion air temperatures, the proportional valve 38 needs a large range of flow capacities. One method is to size the capacity of the valve 38 for the largest volume expected for the output capacity of the combustion system 21. For stoichiometric combustion a fixed quantity of air mass is required to react with a fixed quantity of fuel mass. The flow volume of the combustion air is dependent on the temperature of the air. Hot air is less dense than cold air so for a given mass flow rate the hot air will have a higher volume than the cold air. For example, at 600° C. the density of air is four times lower than air at 50° C., which means that the proportional valve 38 will need to allow four times the volume of hot air compared to cold air for combustion with the fuel. The proportional valve 38 will be full open at the maximum capacity and for the highest design air temperature. Moreover, when modulating the air flow at high temperatures a small change in position of the valve results in a small change in flow volume. However, the lower the combustion air temperature is the greater the density which results in the proportional valve needing to close further to reduce the flow rate. That is, at lower temperatures a small change in the position of the valve results in a disproportionately large change in flow relative to the hot gas. In addition, at lower temperatures the sensitivity of the valve position can cause a hysteresis feedback loop between the temp sensor and valve position where the valve is chasing the fluctuation in the temperature sensor.

In operation the CHP system 100 can experience many transient effects that will cause a varying temperature of the combustion air. In order to stabilize the valve 38 from over compensating the valve position relative to the temperature sensor, it is preferable to utilize a time averaged temperature reading. That is, for example, the sensor would sample the temperature at a minimum of 10 samples per second in order to read the instantaneous value of the gas temperature. Taking a rolling average over a time interval of, for example, 5 seconds will produce a smoother temperature profile that is easier to control with the valve. A shorter interval can be used up to the point where the valve 38 cannot react fast enough. Conversely, a longer interval will have a smoother temperature profile but will cause a lag in the response time to changes in demand from the CHP system. While the time averaged temperature method is used to control the combustion air valve 38, the instantaneous values are used to control the secondary gas proportional valve 48 mixing the expanded working gas with the combustion exhaust prior to the high temperature heat exchanger 24.

By sensing the temperature of the combustion air supply an algorithm which determines air density can be correlated to a specific proportional valve position for any given temperature. In addition the resolution of the valve position can be increased in the low temperature range providing a tighter control of the combustion air.

The gas leaving the combustion chamber 30 enters into a particle separator or filter 23 to separate particulate matter from the combustion gases as depicted at process step 210. In an embodiment a high temperature cyclone particle separator 23 is employed, although other forms of particle separators filters and the like may be utilized. In an embodiment, the high temperature cyclone particle separator is configured to ensure that 99% of particles above 5 microns in size are removed from the hot combustion gases. As the gas passes through the cyclones 41 and 42, particles are accelerated towards the outer shell and travel down the length of the cyclone. At the bottom of the cyclone(s) 41, 42 the particles fall out of suspension into the disengagement hopper 43. In an embodiment, the particles collected in the disengagement hopper 43 are removed by a mechanical auger 44 and motor 45. The auger motor 45 can be run intermittently or continuously depending on the quantity of inorganic material in the solid fuel, the size of the auger 44 and hopper 43. The gas then continues up the center of the cyclone(s) 41, 42 and exits the top into the exhaust plenum 46.

One method of controlling the temperature of the exhaust gas entering the high temperature heat exchanger 24 is to introduce a secondary gas stream either from the turbine working gas (air in this example) or from any other air source including ambient air. Using turbine working gas is preferable as the waste heat is recuperated back into the system prior to the high temperature heat exchanger 24. The combustion system utilizes an exhaust draft fan 26 which maintains a negative pressure within the combustion gas stream. At the exhaust plenum 46, a secondary gas, in this embodiment hot gases from the turbine are introduced. In an embodiment a proportional valve 48 is employed to control the addition of cooler gases with the combustion gases. A proportional valve 48 can vary the air flow from 0%-100%. In operation, the proportional valve 48 is controlled by controller 90 which tells the valve motor 49 to open or close the valve 48 in response to temperature sensors 36, 50 and 68. These gasses are mixed to adjust the temperature of the combustion gas to the desired inlet temperature for the high temperature heat exchanger 24 as depicted at process step 215. The turbine compressed working gas at line 65 is configured to be at a higher pressure than the combustion gases in the exhaust plenum 46 so the turbine compressed working gas will flow without the need of a fan. Proportional valve 48 has similar characteristics as proportional valve 38 with respect to controlling a wide range of flow conditions.

Control of the CHP combustion system and the secondary air valve 48 begins with the electric load on the turbine 22 and the generator 70. The turbine speed will change in response to the electrical load which changes the working gas flow through the expansion turbine 64, and thereby the working gas being heated in the high temperature heat exchanger 24. Temperature sensor 69 senses the working gas temperature leaving the high temperature heat exchanger 24. This temperature is a constant set point temperature. In order to maintain the set point temperature, the combustion gas flow to the high temperature heat exchanger 24 needs to be adjusted based on changes in temperature detected at temperature sensor 69 to deliver the correct amount of energy. This is accomplished by the controller 90 varying the fuel in feed 34 to the combustion chamber to match the desired energy.

Temperature sensor 36 is used to control the temperature of the combustion gases leaving the combustion chamber. It measures the instantaneous temperature of the gas and sends this to the controller 90. The time averaged value is used to compare with the combustion chamber set point value and controls the amount of fuel and air needed to maintain the set point temperature. The instantaneous value is compared to the set point value in order to determine the amplitude of the deviation from the set point value. Temperature sensor 68 is used to sense the temperature of the secondary working gas that will be introduced into valve 48. The temperature of the gas tells the controller 90 the density of the secondary air in order to better control the valve position for varying conditions. When sensor 36 senses a deviation from the set point temperature controller 90 begins to adjust valve 48 in anticipation of the exhaust gas reaching the plenum 46. Temp sensor 50 senses the temperature of the combustion gases entering the heat exchanger and is used to control valve 48 in two ways. The first control algorithm will open or close the valve to a predetermined position based on the temperature of the secondary gas and heat exchanger set point temperature. A second control algorithm works with temp sensor 36 to adjust the sensitivity of the valve in response to the command to adjust valve 48 to the deviations in temperature from the combustion chamber set point temperature.

Upon starting, the proportional valve 48 is fully closed until the temperature measured by the temperature sensor 36 measuring the temperature of the combustion gases exiting the combustion chamber 30 exceeds the desired inlet set point temperature for the heat exchanger 24. As the proportional valve 48 is opened, the heated air from the expansion turbine 64 on line 65 is mixed with the combustion gases in the plenum 46 to maintain and regulate the high temperature combustion gases directed to the high temperature heat exchanger 24 at a substantially constant temperature within a desired tolerance. The proportional valve 48 controls the mass flow of the hot working gas entering the secondary port 47 after the particle separator 23. The proportional valve 48 can be any automatically controlled valve including butterfly, gate, ball, flapper or other mechanical system. The proportional valve 48 is driven by a servo motor 49 connected to the valve 48. The valve 48 can be driven by a DC servo motor, hydraulically, pneumatically or by other electro-mechanical position systems. The servo motor is connected to the controller 90 and is driven by a signal by the controller 90. Another temperature sensor 50 is used to measure the temperature of the combustion gases before entering the high temperature heat exchanger 24. Deviations from the set point temperature of the combustion gases exiting the combustion chamber 30 are measured by temperature sensor 36 and are compensated for by adjusting the proportional valve 48 based on the temperature of temp sensor 68 and is an algorithm that opens the valve based on a calculated estimate of where the valve opening position should be. The temperature of the gas tells the controller 90 the density of the secondary air in order to better control the valve position for varying conditions. The temperature sensor 36 is positioned upstream from where the secondary gas port 47 is located and takes approximately one second for the combustion gases to travel to the secondary gas port 47. This allows time for the signal and valve to begin to adjust before the gas has passed the secondary port 47. Temperature sensor 36 is used to control the temperature of the combustion gases leaving the combustion chamber 30. It measures the instantaneous temperature of the gas and sends this to the controller 90. The time averaged value is used to compare with the combustion chamber set point value and control the amount of fuel directed to the combustion chamber 30 needed to maintain the set point temperature. The instantaneous value is compared to the set point value in order to determine the amplitude of the deviation from the set point value. When sensor 36 senses a deviation from the set point temperature controller 90 begins to adjust valve 48 in anticipation of the exhaust gas reaching the plenum 46. The controller 90 defines the set point temperature for the heat exchanger 24 based on user input and the design constraints for a given high temperature heat exchanger 24 and responds to the measured temperature of temperature sensor 50. Temperature sensor 50 senses the temperature of the combustion gases entering the high temperature heat exchanger 24 and is used to control valve 48 in two ways. The first control algorithm will open or close the valve to a predetermined position based on the temperature of the secondary gas and heat exchanger set point temperature. A second control algorithm works with temp sensor 36 to adjust the sensitivity of the valve in response to the command to adjust valve 48 to the deviations in temperature from the set point temperature. In an embodiment, the controller 90 responds to deviations from the heat exchanger 24 set point temperature with a proportional damping of the rate change signal on proportional valve 48. In an embodiment the temperature of the combustion gases exiting the plenum 46 are regulated to the maximum temperature capability of the high temperature heat exchanger 24. In an embodiment, the temperature of the combustion gases are regulated to 1100° C. In another embodiment, the temperature of the combustion gases are regulated to 950° C. In an embodiment the temperature is regulated with a tolerance of ±100° C. In another embodiment the tolerance is ±50° C. In yet another embodiment the temperature is maintained within a range of ±10° C.

As depicted at process step 225, as the hot combustion gases pass through the high temperature heat exchanger 24 heat is transferred from the combustion gases to the working gas (compressed ambient air) of the turbine 22. In an embodiment, after transferring heat to the working gases the combustion gases may then be utilized for secondary purposes to improve the efficiency and effectiveness of the CHP system 100. In an embodiment, combustion exhaust gas temperatures exiting the high temperature heat exchanger 24 can be as high as about 300° C. However, it will be appreciated that the temperature of the exhaust gases leaving the high temperature heat exchanger 24 depends on heat exchanger efficiency. High heat exchanger efficiency will lower the exhaust temperature. In addition, the temperature of the exhaust gas entering the high temperature heat exchanger 24 will have an impact. In applications where the exhaust gas entering the high temperature heat exchanger 24 is regulated to a lower temperature e.g. 900° C., the temperature exiting the heat exchanger 24 will be lower. The secondary purposes for the use of combustion gases is to provide high temperature heat. In an embodiment the combustion gases may be passed through a second low temperature heat exchanger 25 to reclaim further heat from the combustion gases for lower temperature thermal applications as depicted at optional process step 245. Examples of lower temperature second cycle processes include power generation for example in a second cycle ORC system to generate further work or electricity, hot water, absorption chilling, low temperature drying applications sludge drying, thermal water purification and for space heating and cooling and the like. Further cooled combustion gas leave the low temperature heat exchanger 25 and are pulled through the draft fan 26 and then exhausted. The draft fan 26 is utilized to pull the combustion gases from the combustion chamber 30 through the cyclone particle separators 23 and heat exchanger(s) 24, 25. Employing a draft fan 26 also maintains a negative pressure in the combustion chamber 30 to avoid gases from escaping as well as ensuring that the expanded working gas is pulled into the combustion chamber 30 via valve 38 or plenum 46 via valve 48 to mix with the combustion gases.

The starting of the turbine 22 can be accomplished by either letting the turbine naturally speed up as the temperature of the working gas rises or it can be started with a starter motor. In one embodiment, as the working gas in the high temperature heat exchanger 24 is heated, it expands towards both the expansion turbine 64 and compressor turbine 61. Since the expansion turbine 64 produces more work than the compressor the shaft will turn in the proper direction. As the shaft turns and airflow through the compressor turbine 61 air starts to flow the compressed air will expand further accelerating the flow and the system over time will spool up. In another embodiment a starter motor is employed to bring the turbine 22 and system up to speed more rapidly. In one embodiment, the generator 69 is also configured to operate as a starter to start the turbine 22. As the turbine 22 begins to turn, heated expansion turbine exhaust is available on line 65 to provide secondary air for the valve 48 and port 47 in the particle separator 23 and for primary combustion air via line 66 for the combustion system port 35. While the turbine speed is increasing, the primary combustion air fed to the combustion chamber 30 is also increasing. The thermocouple 36 will sense a change in combustion exhaust gas temperatures and will send a signal to the controller 90 to change the rate of feed of the solid fuel by changing the speed of the rotary valve 34 to regulate the combustion system and continue the cycle. In another embodiment the proportional valve 38 is controlled to maintain the air flow allowed by the combustion chamber 25 and cyclone separator 23. As the fuel feed rate increases/decreases to meet load demand, control of the primary combustion air is performed by the proportional valve 38.

As the system 100 reaches thermal equilibrium the proportional valve 38 is set to allow the sufficient airflow to maintain the desired combustion temperature. The fuel system responds to the load placed on the turbine 22. In an embodiment, as power is demanded the turbine 22 will pull heat from the high temperature heat exchanger 24. The temperature sensor 50 senses a change in temperature of the hot gasses feeding the heat exchanger and either calls for more or less fuel to be combusted depending on the power demand. The controller 90 commands the rotary valve 34 accordingly, increasing or decreasing its speed to allow/maintain sufficient fuel energy to provide the heat required to maintain the set point temperature sensed at sensor 50. The proportional valve 38 is controlled by the controller 90 using several signal inputs and a Proportional Integral Derivative (PID) positioning control algorithm and signal. Temperature sensor 36 measures to the combustion chamber 30 outlet temperature, which is maintained at a desired combustion temperature of about 1150° C. to achieve complete combustion. The temperature sensor 68 on the expansion turbine 64 outlet measures the temperature of the expanded heated working gas and is used by the controller 90 to calculate the energy of the expanded heated working gas per unit of mass used for combustion. In an embodiment it is desirable to ensure that the system 100 operates with a high amount of excess working gas (e.g., the expanded heated working gas, air) so there is always more combustion gas than needed for stoichiometric combustion. As mentioned previously, excess working gas is also used to cool the combustion gases to the desired set point temperature for application to the high temperature heat exchanger 24. Depending on the combustion air temperature controller 90 commands the proportional valve 48 to open/close to allow the necessary air to achieve the desired temperature at the high temperature heat exchanger 24.

Advantageously, in an embodiment, the turbine 22 is connected to the high temperature heat exchanger 24 through an independent gas circuit which allows for a method of transferring heat into the turbine working gas while using fuels that cannot be introduced directly into the gas turbine combustor. The separate gas circuits, eliminate combustion products from adversely affecting the expansion turbine section 64, which in turn reduces maintenance costs and increases component life. Furthermore, the indirect heat transfer means the working gas (air) is dry and clean and after expansion in the turbine is usable for combustion air as well as many other thermal applications. As depicted at optional process step 220, the turbine 22 pulls the clean working gas (e.g., ambient air from the environment) into the inlet of the compressor 61 where the working gas is compressed. The compressed gas is fed through a fluid connection 62 to the cold side inlet port 53 of the high temperature heat exchanger 24. The compressed working gas is heated to the set point temperature for the expansion turbine 64 by extracting heat from the combustion gases flowing through a separate channel in the heat exchanger 24 as was described earlier for process step 225. The heated working gas travels from the heat exchanger port 54 through a fluid connection 63 to the inlet of the expansion turbine 64. The hot working gas is then expanded to produce usable work in the form of shaft powered depicted at process step 230. In an embodiment, the turbine shaft is connected to a generator 69 to convert this work into electric power. In another embodiment, the usable work is used to perform a manufacturing process. For example, the usable work could be used to run a pump or other mechanical process such as mechanical chillers, compressors, vapor compression distillation, conveyance equipment and the like.

In an embodiment, after expansion the hot turbine working gases are then utilized for several primary purposes to improve the efficiency and effectiveness of the CHP system 100. The first is that the hot working gases are employed to provide high temperature combustion air to the combustion system 21 as depicted at process step 235. The gas leaving the expansion turbine 64 travels through fluid connection 66, optionally through proportional valve 38 into the combustion housing 30 via the combustion air port 35. Advantageously, in an embodiment, the turbine exhaust air can be as hot as 600° C. which is higher than can be typically achieved through the use of a combustion air preheater in existing CHP systems. Previous prior art systems have used a recuperator to recover heat within the turbine cycle. This is essential when the combustion occurs internally in the cycle since there is no other way of recovering the heat energy. For external fired cycles this is a detriment since the temperature of the turbine exhaust air has been significantly lowered due to preheating of the compressor air. This means that to use either outside air or turbine air would require an additional heat exchanger to recover the remaining heat in the combustion gases. The described embodiments, by eliminating the use of a recuperator to recover heat within the cycle, allow the turbine exhaust air to be available at higher temperatures than if a combustion air preheater of conventional systems was used.

A second purpose for the use of turbine exhaust air is to regulate and control the temperature of the combustion gases entering the high temperature heat exchanger 24 as described above with reference to process step 215.

The third purpose for the use of turbine exhaust air is to provide high temperature (600° C.), clean, dry air for both high and low thermal applications as depicted at optional process step 240. Hot working gas leaves the turbine 22 through a fluid connection 67. Fluid connection 67 may also be coupled to an external thermal systems to utilize the hot air. The turbine exhaust working gas can be used for second cycle power generation for example in a second cycle ORC system to generate further work or electricity, high temperature drying applications where clean dry air is preferred, sludge drying, thermal water purification and for space heating and cooling. In an embodiment, about 50 percent of the combustion input heat energy, present in the working gas is available for a secondary cycle use. For example, while the primary function of the heated expanded working gas from the expansion turbine 61 is to provide mixing with the combustion gases via port 47 and combustion air for the combustion chamber 30, the remaining hot working gas may be employed for additional heat transfer or work generation. In an embodiment, the working gas temperature at line 67 is about 600° C. Advantageously, for a system 100 sized to generate 100 kW in electrical power, and additional 40 kW-100 kw of power may be generated from a second cycle process. For example a low temperature ORC utilizing the available waste heat could produce an additional 40 kW, while a high temperature ORC could produce an additional 75 kW. Higher efficiency cycles such as closed regenerative Brayton, Stirling or super critical CO2 engines could produce in excess of 100 kW of additional power. Further cooled working gas leaving the second cycle process may be exhausted. Moreover, in some embodiments, the following the second cycle process, the cooled working gas may utilized for any further lower temperature process to reclaim any residual heat, and may even be recycled to start the process again.

In an embodiment the combustion gases exiting the high temperature heat exchanger 24 at port 52 may be passed through a low temperature heat exchanger 25 to reclaim further heat from the cooled combustion gases for lower temperature thermal applications as depicted at optional process step 245. For example, in an embodiment the cooled combustion gases may be at temperatures of about 300° C. and may be used for low temperature applications, including, but not limited to hot water, low pressure steam, bottoming cycle power generation, absorption chilling, and the like. Further cooled combustion gases leave the low temperature heat exchanger 25 and may be exhausted or recycled if desired.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting. While the invention has been described in detail in connection with only a limited number of embodiments, it should be readily understood that the invention is not limited to such disclosed embodiments. Any number of variations, alterations, substitutions or equivalent arrangements not heretofore described, but which are commensurate with the spirit and scope of the claims. Additionally, while various embodiments have been described, it is to be understood that aspects of the invention may include only some of the described embodiments. Accordingly, embodiments are not to be seen as limited by the foregoing description, but is only limited by the scope of the appended claims.

What is claimed is:

1. A method of operating a combined heat and power (CHP) system, the CHP system comprising a combustion system having a combustion chamber and a feed mechanism configured to feed solid fuel into the combustion chamber, the combustion chamber having a combustion air inlet and a combustion gas exhaust, wherein the combustion chamber is configured to receive a flow of an expanded heated secondary gas to the combustion air inlet for combustion of the solid fuel, the CHP system further comprising a proportional valve operably coupled in series with the combustion air inlet and operable to control the flow of the expanded heated secondary gas thereto, a particle separator operatively connected to the combustion chamber and configured to receive combustion gas therefrom, the particle separator having an inlet and an exhaust, the CHP system further comprising an exhaust plenum operatively connected to the exhaust of the particle separator and configured to receive combustion gas therefrom, the exhaust plenum including a secondary gas port operable to direct the expanded heated secondary gas to the exhaust plenum for mixing with the combustion gas to form mixed combustion gases, the CHP system further comprising a first heat exchanger operably coupled to the exhaust plenum and configured to receive the mixed combustion gases therefrom, the first heat exchanger operable to transfer heat from the mixed combustion gases to a compressed secondary gas, the CHP system further comprising a gas turbine having a compression section and an expansion section operably connected on a drive shaft, the gas turbine configured to receive a secondary gas at an inlet to the compression section and compress the secondary gas to form the compressed secondary gas and to direct the compressed secondary gas to an inlet of the first heat exchanger to form a heated compressed secondary gas, the gas turbine configured to receive the heated compressed secondary gas at an inlet to the expansion section to expand the heated compressed secondary gas to form the expanded heated secondary gas and generate work, wherein an output of the expansion section of the gas turbine is operably coupled via a first conduit to the secondary gas port of the exhaust plenum and via a second conduit to the combustion air inlet of the combustion chamber, the CHP further comprising a generator operably connected to the drive shaft of the gas turbine and configured to generate electricity with the work generated in the expansion section, the method comprising:

initiating a combustion process in the combustion chamber and combusting the solid fuel with the expanded heated secondary gas and generating the combustion gas;

regulating a temperature of the combustion gas by mixing the combustion gas with the expanded heated secondary gas to yield the mixed combustion gases;

compressing the secondary gas using the compression section to form the compressed secondary gas;

transferring heat from the mixed combustion gases to the compressed secondary gas in the first heat exchanger to form the heated compressed secondary gas;

expanding the heated compressed secondary gas in the expansion section to form the expanded heated secondary gas and generating work thereby; and     employing the generated work using the generator.

2. The method of claim 1, further including at least one of controlling a feed rate of the solid fuel into the combustion chamber, controlling a flow rate of the expanded heated secondary gas into the combustion chamber, or controlling the regulating of the temperature of the combustion gas, wherein the at least one of controlling the feed rate of the solid fuel, controlling the flow rate of the expanded heated secondary gas, or controlling the regulating of the temperature of the combustion gas is based on at least one of a temperature of the expanded heated secondary gas, a temperature of the mixed combustion gases, a temperature of the combustion gas, or the work generated.

3. The method of claim 2, wherein the controlling the regulating the temperature of the combustion gas includes controlling the flow of the expanded heated secondary gas and mixing the expanded heated secondary gas with the combustion gas after separating particles in the particle separator.

4. The method of claim 1, further including measuring a temperature of the combustion gas.

5. The method of claim 1, further including measuring a temperature of the mixed combustion gases.

6. The method of claim 1, further including measuring a temperature of the expanded heated secondary gas.

7. The method of claim 1, wherein the first heat exchanger is a counter flow heat exchanger.

8. The method of claim 2, wherein the expanded heated secondary gas is at a temperature of about 600° C. and is injected directly into the combustion process.

9. The method of claim 1, wherein the combustion process achieves a temperature of at least one of 1000° C., 1050° C. 1100° C., or 1150° C.

10. The method of claim 1, further including removing particulate matter from the combustion gas with the particle separator.

11. A combined heat and power (CHP) system, the CHP system comprising:

a combustion system having a combustion chamber and a feed mechanism configured to feed solid fuel into the combustion chamber, the combustion chamber having a combustion air inlet and a combustion gas exhaust, wherein the combustion chamber is configured to receive a flow of an expanded heated secondary gas to the combustion air inlet for combustion of the solid fuel;

a proportional valve operably coupled in series with the combustion air inlet and operable to control the flow of the expanded heated secondary gas thereto;

a particle separator operatively connected to the combustion chamber and configured to receive combustion gas therefrom, the particle separator having an inlet and an exhaust;

an exhaust plenum operatively connected to the exhaust of the particle separator and configured to receive combustion gas therefrom, the exhaust plenum including a secondary gas port operable to direct the expanded heated secondary gas to the exhaust plenum for mixing with the combustion gas to form mixed combustion gases;

a first heat exchanger operably coupled to the exhaust plenum and configured to receive the mixed combustion gases therefrom, the first heat exchanger operable to transfer heat from the mixed combustion gases to a compressed secondary gas;

a gas turbine having a compression section and an expansion section operably connected on a drive shaft, the gas turbine configured to receive a secondary gas at an inlet to the compression section and compress the secondary gas to form the compressed secondary gas and to direct the compressed secondary gas to an inlet of the first heat exchanger to form a heated compressed secondary gas, the gas turbine configured to receive the heated compressed secondary gas at an inlet to the expansion section to expand the heated compressed secondary gas to form the expanded heated secondary gas and generate work, wherein an output of the expansion section of the gas turbine is operably coupled via a first conduit to the secondary gas port of the exhaust plenum and via a second conduit to the combustion air inlet of the combustion chamber; and a generator operably connected to the drive shaft of the gas turbine and configured to generate electricity with the work generated in the expansion section.

12. The CHP system of claim 11, further including a control mechanism for controlling a feed rate of the solid fuel into the combustion chamber.

13. The CHP system of claim 12, wherein the control mechanism includes the feed mechanism and a control valve.

14. The CHP system of claim 11, further including a temperature sensor, the temperature sensor operable to sense a temperature of the combustion gas at the combustion gas exhaust.

15. The CHP system of claim 14, wherein the temperature sensor is one of a thermocouple, an infrared detector or a semiconductor detector.

16. The CHP system of claim 14, further including a second temperature sensor, the second temperature sensor operable to sense a temperature of the mixed combustion gases.

17. The CHP system of claim 16, further including a third temperature sensor, the third temperature sensor operable to sense a temperature of the expanded heated secondary gas.

18. The CHP system of claim 11, wherein the particle separator is a cyclonic separator, the cyclonic separator being operably coupled to a hopper for removal of particulate matter.

19. The CHP system of claim 18, wherein the cyclonic separator is configured to remove about 99% of all particulate matter larger than five microns.

20. The CHP system of claim 11, wherein the proportional valve is operably connected to a controller and configured to control the flow of the expanded heated secondary gas to the combustion chamber.

21. The CHP system of claim 20, wherein the controller is configured to operate the proportional valve to control the flow of the expanded heated secondary gas for mixing with the combustion gas based on a temperature of at least one of the expanded heated secondary gas, the combustion gas and the mixed combustion gases.

22. The CHP system of claim 11, wherein the proportional valve is operably connected to a controller and configured to control the flow of the expanded heated secondary gas into the combustion chamber.

23. The CHP system of claim 22, wherein the controller is configured to operate the proportional valve to control the flow of the expanded heated secondary gas to the combustion chamber based on a temperature of at least one of the expanded heated secondary gas, the combustion gas, the mixed combustion gases, or the heated compressed secondary gas.

24. The CHP system of claim 23, wherein the controller is configured to operate the proportional valve to control the flow of the expanded heated secondary gas to the combustion chamber based on the temperature of the expanded heated compressed secondary gas.

25. The CHP system of claim 11, further including a controller, the controller operably connected to at least one of a first temperature sensor, a second temperature sensor, or a third temperature sensor, the controller also operably connected to at least one of the feed mechanism, the proportional valve or a gas valve, the controller configured to control at least one of a feed rate of the solid fuel into the combustion chamber, a flow rate of the expanded heated secondary gas into the combustion chamber, or a temperature of the mixed combustion gases.

26. The CHP system of claim 11, further including a blower and a heater operably connected to the combustion chamber, the blower and the heater configured to operate to initiate combustion of the solid fuel in the combustion chamber.

27. The CHP system of claim 11, further including a draft inducing exhaust fan operably connected to the combustion chamber, the draft inducing exhaust fan configured to maintain the combustion chamber at a lower pressure than a pressure of the expanded heated secondary gas.

28. The CHP system of claim 11, wherein the first heat exchanger is configured as a single counter flow heat exchanger.

29. The CHP system of claim 11, further including a second heat exchanger operably connected to the first heat exchanger and configured to receive the mixed combustion gases that have been cooled in the first heat exchanger, the second heat exchanger operable to transfer heat from the received cooled mixed combustion gases to a secondary working fluid for a secondary application.

* * * * *